United States Patent [19]

Altschul

[11] 4,090,733
[45] May 23, 1978

[54] STORABLE GLARE ELIMINATING DEVICE

[76] Inventor: Louis T. Altschul, 1701 E. Lake St., Glenview, Ill. 60025

[21] Appl. No.: 737,535

[22] Filed: Nov. 1, 1976

[51] Int. Cl.² .............................................. B60J 3/00
[52] U.S. Cl. ................................ 296/97 B; 24/255 R
[58] Field of Search ................. 296/97 R, 97 B, 97 C, 296/97 G, 97 K; 24/255 R, 255 SL, 259

[56] References Cited

U.S. PATENT DOCUMENTS

| 1,599,812 | 9/1926 | Ellis | 296/97 B |
| 2,894,576 | 7/1959 | Williams | 296/97 C |
| 3,329,461 | 7/1967 | Edgar | 296/97 R |
| 3,372,953 | 3/1968 | Weaver | 296/97 K |
| 3,962,758 | 6/1976 | Knappe | 24/255 R |
| 4,003,597 | 1/1977 | Acuff | 296/97 C |

Primary Examiner—Joseph F. Peters, Jr.
Assistant Examiner—John A. Carroll
Attorney, Agent, or Firm—Hill, Gross, Simpson, Van Santen, Steadman, Chiara & Simpson

[57] ABSTRACT

A glare eliminating device for vehicles comprised of a flat support arm, a flat shielding portion of an opaque material to effectively block objectionable glare of the sun or lights from oncoming vehicles coupled with a mounting means of a resilient material formed as a one piece member having a bight portion interconnecting a pair of legs with gripping ribs or flanges formed to securely grip any automobile visor, the component parts providing superior storage capability.

10 Claims, 5 Drawing Figures

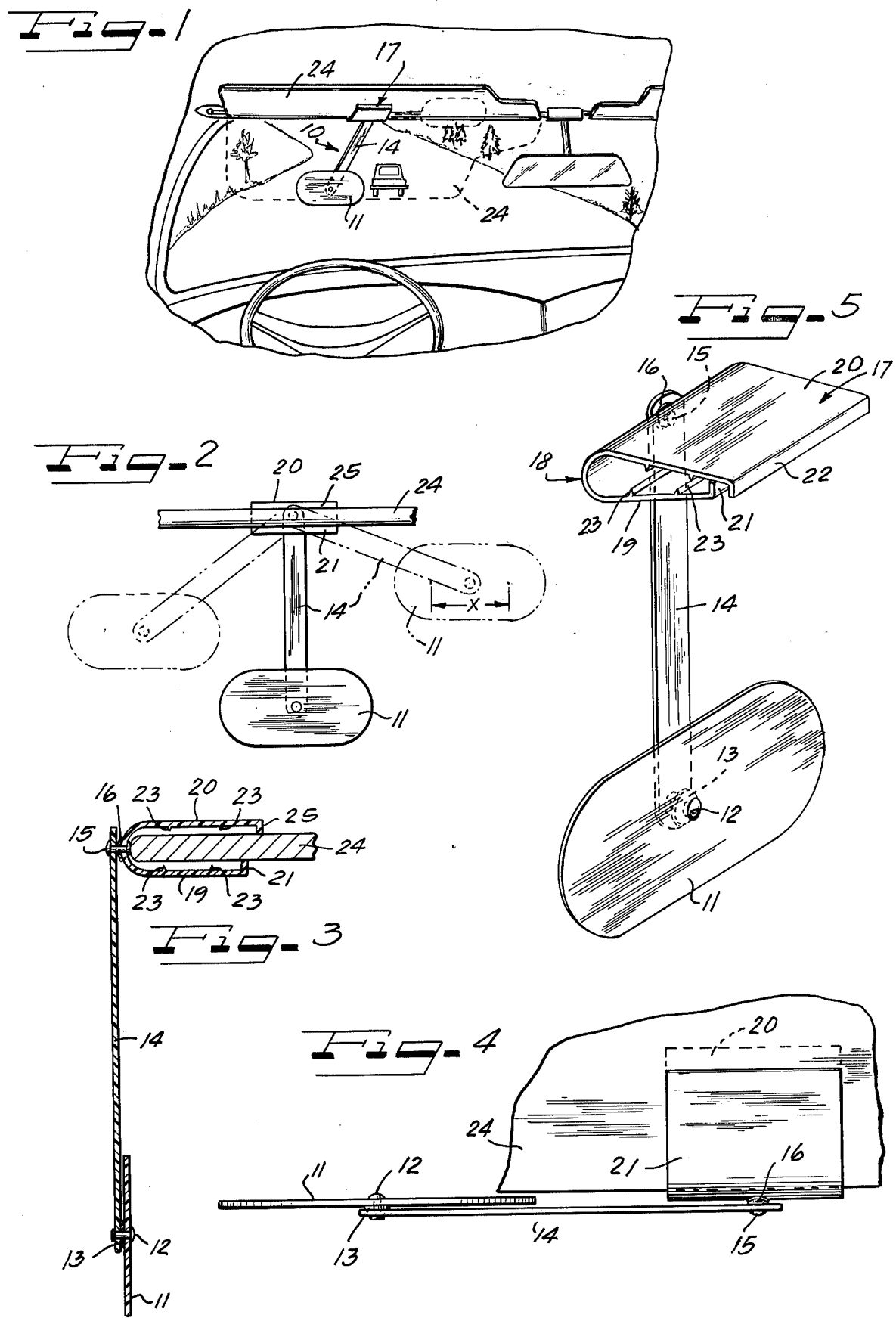

STORABLE GLARE ELIMINATING DEVICE

BACKGROUND OF THE INVENTION

1. Field of the Invention

This invention relates in general to a glare eliminating device and in particular to means which provides for substantial universal adjustment and for easy out of the way storage.

2. Description of the Prior Art

It has always been desirable to provide for a motorist an effective sun and/or headlight shield, having a cross sectional area sufficiently large enough to obscure the objectional rays, but yet small in size as to not obstruct the driver's clear view of the road. The conventional large size fold-down visor is not adequate because of its tendency to obscure such a great portion of a driver's view in attempting to screen out the rays of the sun.

To eliminate glare effecting a motorist from either the sun or from the headlights of on-coming cars, devices, other than conventional visors, have been suggested. Examples of these devices are disclosed in U.S. Pat. Nos. 2,878,714 and 3,261,638. Such devices have been relatively complicated and have had a plurality of spaced shielding areas requiring more than a simple touch of the hand for adjustment. While many previous devices were adjustable to some extent, they were generally characterized by a limited range of adjustment. Thus, these models, which offered only limited adjustment capabilities, left the driver with substantial visual areas where glare from the sun could still be hazardous to safe driving. Likewise, most of these devices required permanent affixation and/or were not readily movable from the initial setting while the vehicle was in motion, and were not readily storable permitting for free access and use of the existing conventional visor.

Reference is made to my U.S. Pat. No. 3,940,180 wherein the disclosed mounting means consisted of a length of hook-type pressure sensitive releasably-engaging cloth materials such as commonly sold under the Trademark VELCRO, affixed by an adhesive along the inner windshield molding or the like and on the bottom of the mounting bracket. An increasing number of foreign and domestic vehicles have inner windshield moldings made of rubber and other materials which reject pressure sensitive adhesives. Likewise, in extreme heat the material occasionally tends to separate from the windshield molding or from the bottom of the mounting bracket.

SUMMARY OF THE INVENTION

The present invention is directed to a glare eliminating device, which is simple, easy to install, inexpensive, readily adjustable and storable. It as well eliminates affixation by use of an adhesive.

To accomplish these results, the invention comprises a glare eliminating device including a support arm, a flat shielding portion of an opaque material pivotally attached at its center to one end of said support arm, and a mounting means pivotally attached to the other end of said support arm, said mounting means of a resilient or thermoplastic material found as a one piece member having a bight portion interconnecting a pair of legs having means for gripping formed on the ends thereof, said bight portion resiliently urging the ends of said legs towards each other so that the means for gripping formed on the ends of said legs will tightly engage the leading edge portion of the usual vehicle sun-visor inserted therebetween.

BRIEF DESCRIPTION OF THE DRAWINGS

Other objects, features and advantages of the invention, together with its organization, construction and operation will be best understood from the following detailed description of a preferred embodiment of the invention, taken in conjunction with the accompanying drawings, on which:

FIG. 1 is a pictorial representation of the view blocked by conventional visors and that of the device of the present invention illustrating its in use and storage positions;

FIG. 2 is a frontal view of the present invention showing the radially adjustable feature;

FIG. 3 is a side view;

FIG. 4 is a pictorial representation of the present invention in a stored position; and FIG. 5 is a perspective view of the present invention.

DESCRIPTION OF THE PREFERRED EMBODIMENT

Referring to FIG. 1, a storable glare eliminating device indicated generally by the reference numeral 10 including a shielding portion 11 having a rectangular shape with rounded corners of the approximate dimension of 4.5 inches in length and 2.25 inches width. The shape of the shielding portion 11, as best illustrated in FIG. 2, is chosen with the dimension X equalling about 2.5 inches, approximating an average eye-to-pupil distance to completely block the objectionable glare from impinging upon the eyes of the motorist, while leaving unobstructed the greatest possible field of vision. As a result of the optical phenomenon referred to as "Binocular Diplopia" occurring under normal vision, the shielding portion 11 will be reduced, in the mind of the motorist, to a black, generally circular-shaped spot of approximately one-half the width of the shielding portion 11, which spot covers the sun effectively for both eyes.

The support arm 14 is approximately 0.5 inch wide and 6 inches long. The shielding portion is pivotally attached by means of a rivet 12 and steel spring or Neoprene washer 13 to one end of the support arm 14. The other end of the support arm 14 is pivotally attached by means of a rivet 15 and a spring or Neoprene washer 16 to a mounting means 17 at approximately the center of its bight portion 18. The configuration of the mounting means 17 is best seen in FIG. 5. The rivet 15 and the spring or Neoprene washer 16 provide sufficient frictional engagement between the support arm 14 and the mounting means 17 to retain the selected relative positions of the support arm 14 and the mounting means 17 after adjustment. A similar frictional engagement is provided by the rivet 12 and the spring or Neoprene washer 13 between the shielding portion 11 and the support arm 14.

The mounting means 17 is preferably formed from a tough thermoplastic material such as for example ABS (a copolymer of acrylonitrile, butadiene and styrene), which will adapt to the thickness of the item to which it is attached in approximately 24 hours and remain tightly resiliently engaged thereto. The mounting means 17, as best illustrated in FIG. 5, is comprised of a bight portion 18 with an ID radius of about ⅜ inch interconnecting a pair of legs, 19 and 20, having means for gripping formed on the ends thereof, flanges 21 and 22, respectively. Leg 20 is approximately 2.5 inches wide and 2 inches long, and leg 19 is approximately 2.5 inches wide and 1.75 inches long. The gripping means, ribs or flanges 21 and 22, have a length of approximately 0.25 inch and extend the width of the legs, approximately 2.5 inches, and perpendicular thereto. The gripping means, flanges 21 and 22, overlap as a result of the 0.25 inch difference in the lengths of the legs 19 and 20.

Two visor-engaging ribs 23 are provided on the interior surface of each leg 19 and 20 having an approximate height of 1/32 inch which run parallel to the flanges for the width of the legs.

FIG. 1 illustrates that the storable glare eliminating device constructed in accordance with the present invention will effectively screen objectionable glare from the driver with absolute minimum obstruction of the area required by a conventional sun visor 24 (as indicated by the dotted lines) while at the same time providing for a convenient method of storage, wherein the support arm 14 and shielding portion 11 are pushed up parallel with the leading edge of the vehicle visor (as indicated by the dotted line configuration), while allowing the regular up and down use of the automobile visor without interference therewith. The stored position is more specifically illustrated in FIG. 4. As can be seen from FIGS. 3 and 4, the shield 11 is stored slightly ahead, or in front of the regular visor in a manner perpendicular to visor 11, permitting ordinary pivotal rise even though the visor is tilted downwardly. Thus, the relatively simple device may be placed completely out of use in the storage condition in which it does not interfere in any way with conventional automobile operation.

Variations may be made without departing from the novel concepts of my invention, it is therefore intended that the scope of the invention be limited solely by the hereinafter appended claims.

I claim as my invention:

1. A storable glare eliminating device for use on vehicles, comprised of:
   a flat support arm;
   a flat shielding portion of an opaque material pivotally attached at its center to one end of said support arm; and
   a mounting means for said support arm,
      said mounting means being constructed of a resilient material formed as a one-piece member having a bight portion interconnecting a pair of of legs having means for gripping formed on the ends thereof,
      said bight portion resiliently urging the ends of said legs towards each other so that said means for gripping will grippingly engage the sun visor of the vehicle inserted therebetween;
   pivot means in said bight portion providing pivotal movement of said support arm in a plane generally perpendicular to the sun visor;
whereby said storable glare eliminating device can be horizontally positioned by selectively sliding said mounting means along the surface of the gripped portion of the vehicle, and can be vertically adjusted by the radial movement of said support arm to position the shielding portion in any selected area to obscure objectionable sunlight or headlights of on-coming vehicles, and can be stored by positioning said shielding portion generally in line with the visor.

2. A storable glare eliminating device in accordance with claim 1, wherein
   said legs each carry a perpendicular rib formed to overlap from a difference in the length of the legs.

3. A storable glare eliminating device in accordance with claim 1, wherein
   each of said legs has at least one rib on its inner surface running the width of said leg parallel to the flange.

4. A storable glare eliminating device in accordance with claim 1, wherein
   each of said legs has two ribs on its inner surface running the width of said leg parallel to the flange and to each other,
whereby said ribs in conjunction with the end flanges prevent forward slippage while guiding with ease the side-to-side movement of the mounting means.

5. A storable glare eliminating device in accordance with claim 1, wherein
   said mounting means is formed from a thermoplastic material.

6. A storable glare eliminating device for use on vehicles wherein a flat shielding portion of an opaque material is pivotally attached to one end of a support arm including a mounting means pivotally attached at the other end of said support arm, said mounting means being of a resilient material and formed as a one-piece member having a bight portion interconnecting a pair of legs having means for gripping formed on the ends thereof, said bight portion resiliently urging the ends of said legs towards each other so that said means for gripping will grippingly engage the edge of the sun visor of the vehicle, inserted therebetween, and said bight portion having pivot means therein for permitting pivotal movement of said support arm in a plane perpendicular to said visor.

7. A storable glare eliminating device in accordance with claim 6, wherein
   said legs end in perpendicular flanges formed to overlap from a difference in the length of the legs.

8. A storable glare eliminating device in accordance with claim 6, wherein
   each of said legs has at least one rib on its inner surface running the width of said leg parallel to the flange.

9. A storable glare eliminating device in accordance with claim 7, wherein
   each of said legs has two ribs on its inner surface running the width of said leg parallel to the flange and to each other.

10. A storable glare eliminating device in accordance with claim 6, wherein said mounting means is formed from a thermoplastic material.

* * * * *